United States Patent
Hoff

(10) Patent No.: US 9,928,202 B2
(45) Date of Patent: Mar. 27, 2018

(54) TIME-DIVISION MULTIPLEXING DATA BUS

(71) Applicant: Fermi Research Alliance, LLC, Batavia, IL (US)

(72) Inventor: James R. Hoff, Wheaton, IL (US)

(73) Assignee: Fermi Research Alliance, LLC, Batavia, IL (US)

( * ) Notice: Subject to any disclaimer, the term of this patent is extended or adjusted under 35 U.S.C. 154(b) by 82 days.

(21) Appl. No.: 15/134,520

(22) Filed: Apr. 21, 2016

(65) Prior Publication Data

US 2016/0314090 A1    Oct. 27, 2016

Related U.S. Application Data

(60) Provisional application No. 62/150,340, filed on Apr. 21, 2015.

(51) Int. Cl.
 *H04L 1/00* (2006.01)
 *G06F 13/42* (2006.01)

(52) U.S. Cl.
 CPC .................... *G06F 13/42* (2013.01)

(58) Field of Classification Search
 CPC ..................................... G06F 13/42
 See application file for complete search history.

(56) References Cited

U.S. PATENT DOCUMENTS

| | | | |
|---|---|---|---|
| 5,392,423 A | 2/1995 | Yetter | |
| 6,958,627 B2 | 10/2005 | Singh et al. | |
| 7,685,345 B2 | 3/2010 | Dunn et al. | |
| 8,362,802 B2 | 1/2013 | Nowick et al. | |
| 8,669,779 B2 | 3/2014 | Gill et al. | |
| 8,766,667 B2 | 7/2014 | Nowick et al. | |
| 8,872,544 B2 | 10/2014 | Gill et al. | |

(Continued)

OTHER PUBLICATIONS

Horak, M. N. et al., "A Low-Overhead Asynchronous Interconnection Network for GALS Chip Multiprocessors," IEEE Transactions on Computer-Aided Design of Integrated Circuits and Systems (2011) 30(4):494-507.

Kumar, N. et al., "An Analog VLSI Chip with Asynchronous Interface for Auditory Feature Extraction," IEEE Transactions on Circuits and Systems-II: Analog and Digital Signal Processing (1998) 45(5):600-606.

Singh, M. et al., "MOUSETRAP: Ultra-High-Speed Transition-Signaling Asynchronous Pipelines," 2001 International Conference on Computer Design, Austin, TX, Sep. 23-26, pp. 9-17.

(Continued)

*Primary Examiner* — Clemence Han
(74) *Attorney, Agent, or Firm* — Kevin Soules; Luis M. Ortiz; Kermit D. Lopez

(57) ABSTRACT

A two-to-one multiplexor comprises a first data input configured to hold data provided from a first preceding asynchronous pipeline stage and a second data input configured to hold data provided from a second preceding asynchronous pipeline stage, a 4-phase bundled data protocol facilitating communication between the first and the second data inputs and the first and second preceding asynchronous pipeline stage, an arbitration unit connected to the first data input and the second data input, and configured to select which of the data from the first and the second data inputs is released, a request release unit, and a reset unit wherein the arbitration unit, the request release unit, and the reset unit implement and complete a second 4-phase bundled data protocol facilitating communication with a succeeding asynchronous pipeline stage for transmission of the data chosen by the arbitration unit thereby providing asynchronous multiplexing of the data.

18 Claims, 8 Drawing Sheets

(56) References Cited

U.S. PATENT DOCUMENTS

| | | | | |
|---|---|---|---|---|
| 2002/0176447 | A1* | 11/2002 | Marx | H04W 56/00 370/503 |
| 2002/0178392 | A1* | 11/2002 | Marx | H03K 5/133 713/500 |
| 2005/0271054 | A1* | 12/2005 | Kang | H04L 47/24 370/389 |
| 2006/0149989 | A1* | 7/2006 | Marx | G06F 5/06 713/500 |
| 2008/0123765 | A1* | 5/2008 | Oh | H04L 25/0264 375/267 |
| 2009/0150706 | A1* | 6/2009 | Oh | G06F 1/3203 713/400 |
| 2012/0102300 | A1* | 4/2012 | Oh | G06F 9/3869 712/25 |
| 2014/0064096 | A1* | 3/2014 | Stevens | G06F 13/385 370/236 |

OTHER PUBLICATIONS

Singh, M. et al., "MOUSETRAP: High-Speed Transition-Signaling Asynchronous Pipelines," IEEE Transactions for Very Large Scale Integration (VLSI) Systems (2007) 15(6):684-698.
Yarema, R. et al., "Fermilab Silicon Strip Readout Chip for BTeV," IEEE Transactions on Nuclear Science (2005) 52(3):799-804.
Re, V. et al., "FSSR2, a Self-Triggered Low Noise Readout Chip for Silicon Strip Detectors," IEEE Transactions on Nuclear Science (2006) 53(4):2470-2476.
Hoff, J. R. et al. "FPHX: a New Silicon Strip Readout Chip for the PHENIX Experiment at RHIC," IEEE Nuclear Science Symposium Conference Record (2009) Orlando, FL, Oct. 24-Nov. 1, pp. 75-79.

* cited by examiner

TIME-DIVISION MULTIPLEXING DATA BUS

CROSS REFERENCE TO RELATED PATENT APPLICATIONS

This patent application claims the priority and benefit under 35 U.S.C. § 119(e) of U.S. Provisional Patent Application Ser. No. 62/150,340 filed Apr. 21, 2015, entitled "TIME-DIVISION MULTIPLEXING DATA BUS." U.S. Provisional Patent Application Ser. No. 62/150,340 is herein incorporated by reference in its entirety.

STATEMENT OF GOVERNMENT RIGHTS

The invention described in this patent application was made with Government support under the Fermi Research Alliance, LLC, Contract Number DE-AC02-07CH11359 awarded by the U.S. Department of Energy. The Government has certain rights in the invention.

FIELD OF THE INVENTION

Embodiments are generally related to the field of signal processing. Embodiments are further related to asynchronous communication. Embodiments are related to digital communication. Embodiments are also related to integrated circuits. Embodiments are further related to methods and systems for asynchronous time division multiplexing.

BACKGROUND

Asynchronous communication is the transmission of data, generally without the use of an external clock signal. Data transmission occurs intermittently rather than in a steady stream. To affect communications from sender to receiver, the communications themselves must somehow be made time independent, a predefined understanding of communication timing must exist between the sender and receiver, or there must be some form of signaling protocol between sender and receiver.

The most common signaling protocol is known as "Request-Acknowledge," "Handshake," or "Asynchronous Handshake." A data sender signals a request when it has new data. A data receiver signals an Acknowledge in response to the request. Signaling protocols can be either transition-signaling or level-signaling.

Transition-signaling implies that EITHER a transition from a logical-0 to a logical-1 OR a transition from a Logical-1 to a Logical-0 on the request line implies a request. Similarly, a transition in either direction on the acknowledge line implies an Acknowledge. Transition-signaling is often called a two-phase protocol. Transition-signaling is generally understood to be faster than level-signaling.

In level-signaling, a specific logical value on the request line implies a request. In the absence of that specific logical value, there is no request. Similarly, a specific logical value on the acknowledge line implies an Acknowledge. In the absence of that specific logical value, there is no acknowledge. Level-signaling is often called a four-phase protocol because of the four phases in the handshake—request assertion (by the sender), acknowledge assertion (by the receiver), request withdrawal (by the sender), and, finally, acknowledge withdrawal (by the sender). Regardless of the nature of the signaling protocol, when the request and acknowledge are transmitted with the data, this is referred to as a bundled data protocol.

Some prior art methods and systems provide a high-speed asynchronous pipeline. Such methods and systems may use a transition-signaling bundled data protocol where the bundled data and request inputs travel together through transparent latches until the system recognizes that the request is present within its latches. Then the latches are simultaneously closed (made opaque) and the system signals acknowledge. This allows incoming data and requests to follow virtually identical delay paths. Data and request travel through identical latches all of which are transparent at the same time, then the request must pass through some additional logic, which recognizes the presence of the request. The phase delay through this additional logic has the effect of reducing the significance of any timing dispersions within the bundled data.

However, such prior art approaches are limited because they are not amenable to time division multiplexing applications. That is to say, they offer no inherent ability to arbitrate between two streams and, even if arbitration were present, its use of transition-signaling makes time division multiplexing difficult.

As such, prior art methods and systems do not provide a theoretically ideal transition-signaling system where a request transition from a logical-1 to a logical-0 is equal to a request transition from a logical-0 to a logical-1. Prior art approaches include a pipeline stage that will only accept a request transition from a logical-1 to a logical-0 if, in the most recent past, it has just accepted a request transition from a logical-0 to a logical-1.

For some applications, this limitation is inconsequential because the previous pipeline stage will, naturally, make a request transition from a logical-1 to a logical-0 and then a second request transition from the logical-0 back to the logical-1. However, in applications with two or more streams, preceding pipeline stages cannot know which transition (1-to-0 or 0-to-1) a time division multiplexing stage is expecting, in order to request a new transfer of data. Therefore, there is an unmet need for a high-speed asynchronous protocol that expands data arbitration capabilities.

SUMMARY

The following summary is provided to facilitate an understanding of some of the innovative features unique to the embodiments disclosed and is not intended to be a full description. A full appreciation of the various aspects of the embodiments can be gained by taking the entire specification, claims, drawings, and abstract as a whole.

It is, therefore, one aspect of the disclosed embodiments to provide a method and system for data transmission.

It is another aspect of the disclosed embodiments to provide a method and system for multiplexing.

It is another aspect of the disclosed embodiments to provide a method and system for asynchronous time division multiplexing.

The aforementioned aspects and other objectives and advantages can now be achieved as described herein. Systems and methods for multiplexing comprise a two-to-one multiplexor including a first data input configured to hold data provided from a first preceding asynchronous pipeline stage and a second data input configured to hold data provided from a second preceding asynchronous pipeline stage, a four-phase bundled data protocol facilitating communication between the first and the second data inputs and the first and second preceding asynchronous pipeline stage, an arbitration unit connected to the first data input and the second data input, and configured to select which of the data from the first and the second data inputs is released, a request release unit, and a reset unit wherein the arbitration unit, the request release unit, and the reset unit implement and complete a second four-phase bundled data protocol facilitating communication with a succeeding asynchronous pipeline stage for transmission of the data chosen by the arbitration unit thereby providing asynchronous multiplexing of the data.

BRIEF DESCRIPTION OF THE FIGURES

The accompanying figures, in which like reference numerals refer to identical or functionally-similar elements throughout the separate views and which are incorporated in and form a part of the specification, further illustrate the embodiments and, together with the detailed description, serve to explain the embodiments disclosed herein.

DETAILED DESCRIPTION

Figure 1A:
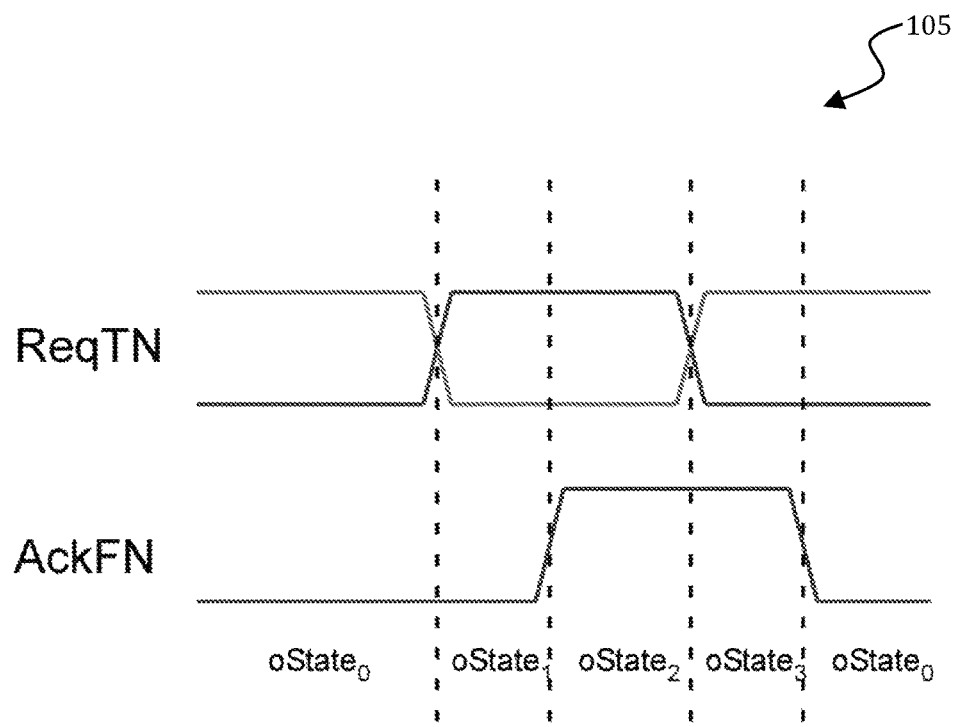
FIG. 1A depicts a 4-phased bundled-data asynchronous protocol to a data originator used in an exemplary embodiment of a time-division multiplexing (TDM) system.

Subject matter will now be described more fully hereinafter with reference to the accompanying drawings, which form a part hereof, and which show, by way of illustration, specific example embodiments. Subject matter may, however, be embodied in a variety of different forms and, therefore, covered or claimed subject matter is intended to be construed as not being limited to any example embodiments set forth herein; example embodiments are provided merely to be illustrative. Likewise, a reasonably broad scope for claimed or covered subject matter is intended. Among other things, for example, subject matter may be embodied as methods, devices, components, or systems. Accordingly, embodiments may, for example, take the form of hardware, software, firmware, or any combination thereof (other than software per se). The following detailed description is therefore, not intended to be taken in a limiting sense.

Throughout the specification and claims, terms may have nuanced meanings suggested or implied in context beyond an explicitly stated meaning. Likewise, the phrase "in one embodiment" as used herein does not necessarily refer to the same embodiment, and the phrase "in another embodiment" as used herein does not necessarily refer to a different embodiment. It is intended, for example, that claimed subject matter include combinations of example embodiments in whole or in part.

In general, terminology may be understood, at least in part, from usage in context. For example, terms, such as "and", "or", or "and/or," as used herein may include a variety of meanings that may depend, at least in part, upon the context in which such terms are used. Typically, "or" if used to associate a list, such as A, B, or C, is intended to mean A, B, and C, here used in the inclusive sense, as well as A, B, or C, here used in the exclusive sense. In addition, the term "one or more" as used herein, depending at least in part upon context, may be used to describe any feature, structure, or characteristic in a singular sense or may be used to describe combinations of features, structures or characteristics in a plural sense. Similarly, terms such as "a," "an," or "the," again, may be understood to convey a singular usage or to convey a plural usage, depending at least in part upon context. In addition, the term "based on" may be understood as not necessarily intended to convey an exclusive set of factors and may, instead, allow for existence of additional factors not necessarily expressly described, again, depending at least in part on context.

As used herein, the term "flip-flop" means a bistable mutivibrator having two states and a feedback path that allows it to store a bit of information, with outputs only capable of changing state when a control signal goes from high to low or low to high.

As used herein, the term "latch" means an asynchronous bistable mutivibrator having two states and a feedback path that allows it to store a bit of information, with outputs capable of changing as soon as the inputs change if the latch is enabled (transparent). However, if the latch is disabled (opaque), then changes on the input have no effect on the output.

As used herein, the term "TDM system block" means a complete 2-to-1 multiplexing pipeline stage.

A four-phase asynchronous protocol is a basic asynchronous protocol. In general, each cell receives a request from its predecessor and provides an Acknowledge to that predecessor. Similarly, each cell supplies a separate request to its successor and receives an Acknowledge from that successor. This framework supports the current embodiments.

The embodiments disclosed herein describe a fully asynchronous 2-to-1 multiplexor comprising two independent data input stages, an arbitration module, a request/release module, and a reset module. Each data input stage implements and completes an independent 4-phase bundled data protocol. The 4-phase bundled data protocol is used for communication with a separate, preceding asynchronous pipeline stage.

Through the independent 4-phase bundled data protocols, each data input stage captures incoming asynchronous data from its preceding pipeline stage and holds that data indefinitely. The arbitration module and release/reset module implement and complete another independent 4-phase bundled data protocol with a succeeding asynchronous pipeline stage. Each data input stage connects to the arbitration module and informs it of the presence or absence of data held within that data input stage. The arbitration module chooses data from one or the other of the associated input stages and releases the chosen data to the subsequent asynchronous pipeline stage using the 4-phase bundled data protocol implemented by the arbitration module, request/release module, and reset module.

As noted above, the arbitration module selects either one or the other of the data input stages as the winner of the arbitration. The winner of the arbitration is then allowed to release its data downstream. Regardless of the winner, the arbitration deliberately does not create a special state under which neither data input stage has won the arbitration yet. In an embodiment, the arbitration module implements its arbitration with a hold-dominant set-reset latch. The asynchronous 2-to-1 multiplexor can gate the request signal to the subsequent stage with the acknowledge signal from the subsequent stage within the request/release module.

The asynchronous 2-to-1 multiplexor described herein can implement fully differential request lines for all of its 4-phase bundled data protocol and thus creates a capture logic within each data input stage that ensures that both true and inverted versions of the request have arrived to the data input stage with the appropriate logical values. In an embodiment, the multiplexor can include data and request capturing latches with simple data latches within the data input stages. The data and request capturing latches can be Earle latches which improve bit error rate in the data input stages.

In another embodiment, the asynchronous 2-to-1 multiplexor can store a captured request in its data input stages and then use that stored value to alert the arbitration module to the presence of data within the data input stage. This same stored value is used to close the data and request capturing latches and is broadcast back to the preceding stage as the acknowledge signal of the asynchronous 4-phase protocol. As described herein, the captured request can be stored within the data input stages using a reset-dominant set-reset latch.

The systems and methods disclosed herein can provide a time division multiplexor. Unlike prior art approaches, the time division multiplexor also looks and functions as a pipeline stage. In the embodiments disclosed herein the previous pipeline stage thinks the input stages of the embodiment looks like a pipeline stage input and successive pipeline stages think that the output of the embodiment looks like a pipeline stage output. Each input stage acts like a pipeline stage in that it captures the data sent to it.

In asynchronous communication, it is a common problem for the bundled data (the grouping of request and data) to spread out in time. This can occur for a variety of reasons mostly related to the difference in speed between a traveling 1 and a traveling 0 and to the distribution of parasitic impedance across the different bits of the bundled data. The embodiments disclosed herein require the request line to be differential. Thus, if there is a bit speed difference between a 1 and a 0, it is irrelevant because both a 1 and a 0 are part of the request. The embodiments also require that the request being input and the captured request be identical and at the proper logic value. This reduces the possibility that noise can cause false captures.

In the embodiments disclosed herein, the capture logic is captured with a set reset latch. The output of this latch can be called "I Have Data" (or "ihavedata"). Because there are two input stages, there are two "I Have Data" signals that are provided to the arbitrator module. The two "I Have Data" signals are the signals that require arbitration by the arbitrator module. The signal also closes the latches (makes them opaque) and becomes the acknowledge signal to the preceding stage.

The methods and systems disclosed herein are designed to make sure that no matter what the arbitration module thinks, the next request cannot be sent to the subsequent pipeline stage until the subsequent pipeline stage has withdrawn its acknowledge of the last data received. Thus, the request signal is gated within the release logic by the acknowledge signal of the subsequent pipeline stage.

In an embodiment, an asynchronous controller has 4 principal IO signals, Request From Previous (ReqFP), Acknowledge To Previous (AckTP), Request To Next (ReqTN), and Acknowledge From Next (AckFN). In a 4-Phase protocol, the assertion of a Request, the assertion of an Acknowledge, the withdrawal of a Request, and the withdrawal of an Acknowledge can all have independent meaning. FIG. 1A illustrates, from the perspective of a data originator, a cycle 105 of four asynchronous states. These are labeled as $oState_x$ for output state X in accordance with an embodiment. The asynchronous output states are summarized in table 1.

TABLE 1

Asynchronous Output States

| ReqTN | AckFN | | | Meaning |
|---|---|---|---|---|
| 0 | 0 | $oState_0$ | Acknowledge Withdrawn | No Data to Send and/or Destination Ready for Data |
| 1 | 0 | $oState_1$ | Request Asserted | Data being driven by Data Originator and available for Data Destination |
| 1 | 1 | $oState_2$ | Acknowledge Asserted | Data Captured at Destination |
| 0 | 1 | $oState_3$ | Request Withdrawn | Destination Unavailable |

Figure 1B:
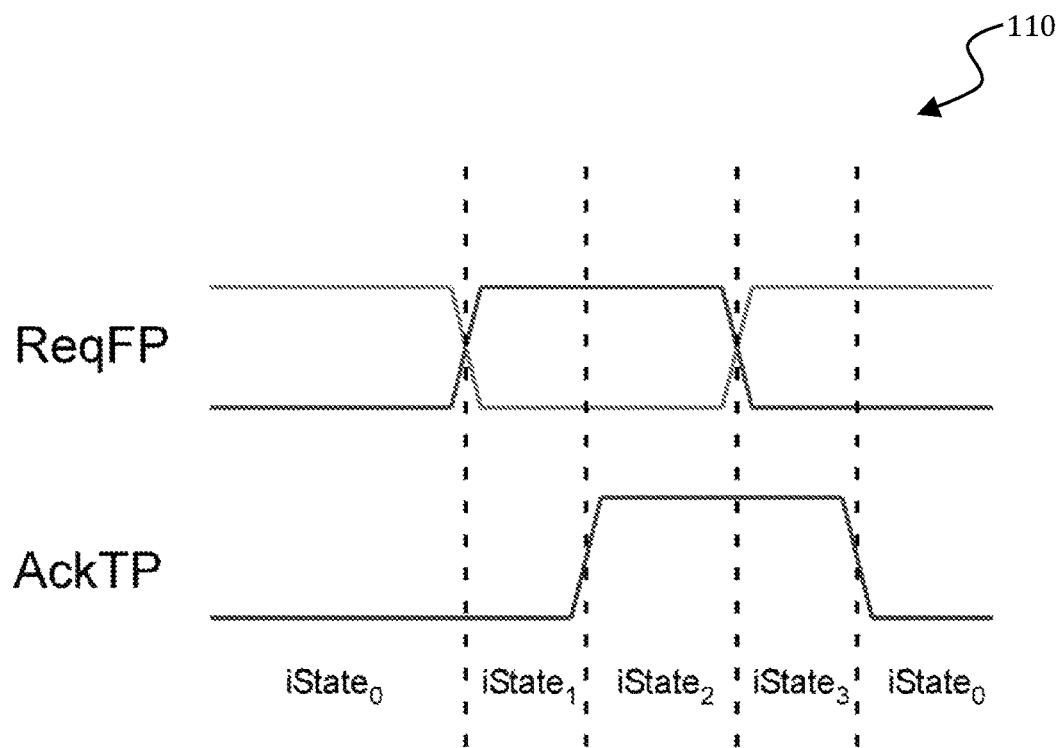
FIG. 1B depicts a 4-phased bundled-data asynchronous protocol to a data destination used in an exemplary embodiment of a time-division multiplexing (TDM) system.

FIG. 1B illustrates, from the perspective of a data destination, a cycle 110 of four related asynchronous states in accordance with an embodiment. These are labeled as $iState_x$ for input state X. The asynchronous output states are summarized in table 2.

TABLE 2

Asynchronous Input States

| ReqFP | AckTP | | | Meaning |
|---|---|---|---|---|
| 0 | 0 | $iState_0$ | Acknowledge Withdrawn | Idle State. No useful incoming data available |
| 1 | 0 | $iState_1$ | Request Asserted | Data being driven from Data Originator |
| 1 | 1 | $iState_2$ | Acknowledge Asserted | Data has been captured by Data Destination. Data Originator is free to do other things. Data Being Used |
| 0 | 1 | $iState_3$ | Request Withdrawn | Data Being Used |

In the embodiments disclosed herein, each stage of the conflux pipeline can simultaneously be a data destination to its predecessor pipeline stage and a data originator to its successor pipeline stage. Of particular significance is the combination of iState1 and oState3. The capturing of data occurs sometime during iState1. Sometime during oState3, a data originator is free to move on to the next task. However, for the 4-phase protocol to work property, a rule must be incorporated: even if new data is available to send, it cannot be sent until the AckFN is withdrawn. To accomplish all this, a state variable is required—IhaveData—which is activated during iState1 after ReqFP has been captured by the data destination and released in oState3 after the AckFN has been received. IhaveData causes the transition to iState2 and the assertion of AckTP. Finally, requests are required to be differential to allow for possible differences in processing speeds of 1 s and 0 s. Accordingly, requests will be captured by the same latches used to capture the bundled data. Table 3 summarizes the results.

TABLE 3

State of the Capture Latches

| ReqFP | AckTP | Meaning | | IhaveData | Latch State |
|---|---|---|---|---|---|
| 0 | 0 | Acknowledge Withdrawn | No useful data | 0 | Transparent |
| 1 | 0 | Request Asserted | Data Being Sent | $0^2$ | Transparent |
| 1 | 1 | Acknowledge Asserted | Data Being Used | 1 | Opaque |
| 0 | 1 | Request Withdrawn | Data Being Used | 1 | Opaque |

Figure 2:
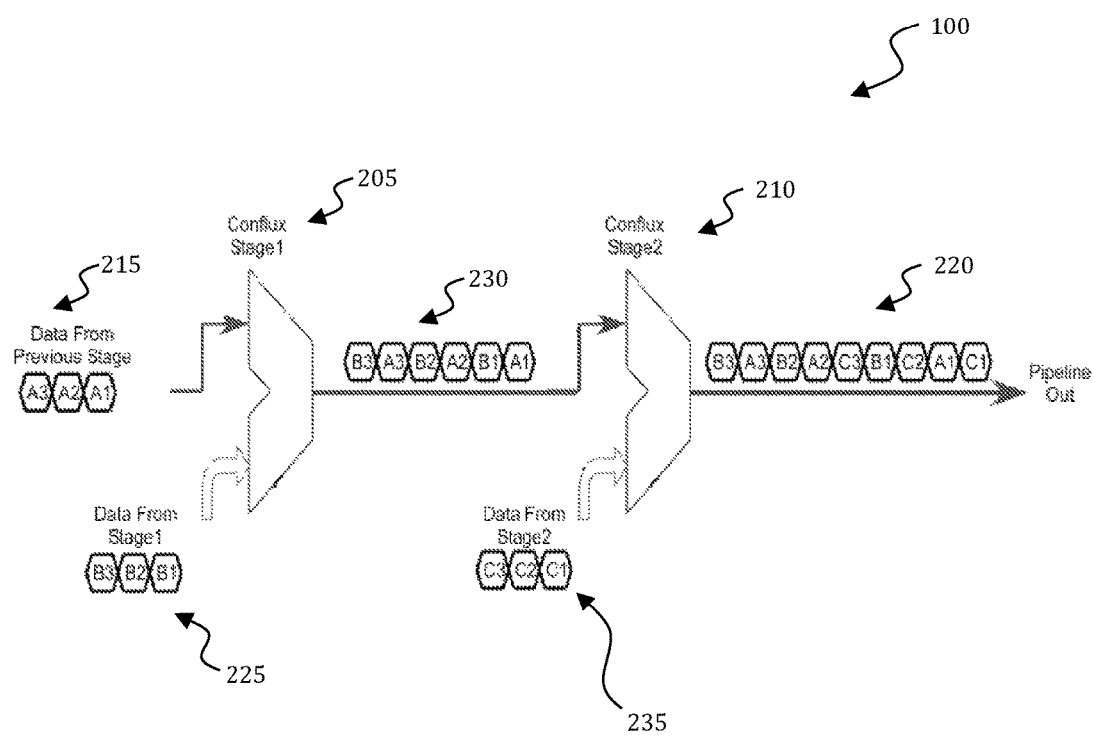
FIG. 2 depicts an exemplary embodiment of a TDM system having two stages and data from a previous stage in accordance with an example embodiment.

FIG. 2 illustrates an exemplary embodiment of time division multiplexing in a time division multiplexing system 100 having two stages; conflux stage 205 and conflux stage 210. It should be understood that an indefinite number of conflux stages can be chained together to form an asynchronous time division multiplexing pipeline for integrated circuits. The embodiments thus function as an on-demand 2-to-1 multiplexor pipeline stage as well as a pipeline stage. Conflux stages connected end-to-end provide a high-speed asynchronous pipeline from one point to another. Moreover, each conflux stage can provide a gateway into the pipeline for a data source located there. Once a data packet is on the pipeline, it moves as rapidly as traffic allows to the pipeline out.

In FIG. 2, data 215 is provided from a previous stage. Each readout of time division multiplexing system 100 is an asynchronous 2-to-1 multiplexor for time division multiplexing. Each readout merges two independent asynchronous data streams into one data output stream 220 that can interleave the data from the two input streams in time.

In the exemplary embodiment shown in FIG. 2, the two time division multiplexing system stages (conflux stage 205 and conflux stage 210) are linked in series. Conflux stage 205 has two independent data streams one data stream 215 from the previous TDM system stage (i.e. A1, A2, A3) and the other data stream 225 from within the current stage (i.e. B1, B2, B3). TDM system 100 merges these into an output data stream 230 (i.e. A1, B1, A2, B2 . . . ). Stage 210 performs the analogous operation with output data stream 230 and independent data stream 235 from its super column (i.e. C1, C2, C3). When there is ample data at both inputs to TDM system 100, TDM system 100 will alternately select each input for transfer. Which input is first selected by the arbiter depends on the startup condition or state of the last data transfer. When only one input has data, it is guaranteed selection.

In the exemplary embodiment shown, each TDM system input, such as independent data streams 215, 225, or 235 or output data stream 220, must appear as an independent pipeline stage to its predecessor. Therefore, each input for TDM system 100 must fulfill the obligations of a 4-phase handshake, thereby capturing data and releasing its predecessor to process new data. At the same time, unlike a simple pipeline stage, each input for TDM system 100 does not have exclusive right to the output. TDM system 100 is a multiplexor; when one input has data, the other input may control the output. It is also possible that both inputs could capture data at exactly the same time. Therefore, each input must be prepared to hold its data until the arbitrator grants it access to the output. While holding the data, each input must maintain appropriate 4-phase signaling to its predecessor so that new data is not lost. All of this is the responsibility of the capture logic.

Figure 3A:
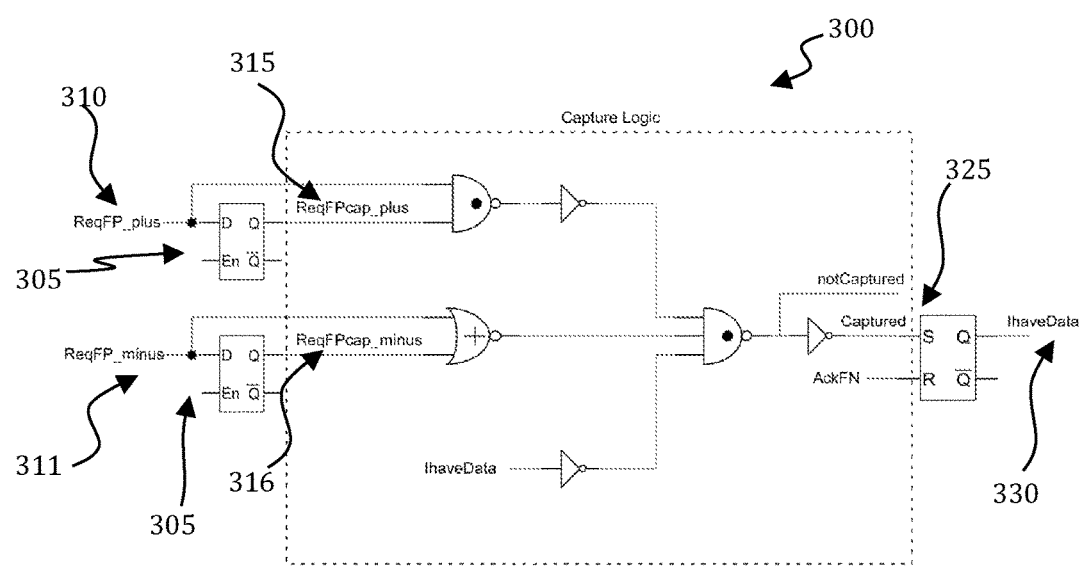
FIG. 3A illustrates the capture logic of a TDM system, in accordance with an example embodiment.

FIG. 3A illustrates an exemplary embodiment of the capture logic 300 of TDM system 100. The capture logic 300 compares the incoming ReqFP and the captured ReqFP (ReqFPcap). ReqFP_plus 310 must equal ReqFPcap_plus 315 and both must be a logical 1. ReqFP_minus 311 must equal ReqFPcap_minus 316 and both must be a logical 0. This condition represents a fixed recognition of iState1 (i.e., the oState1 of the data originator). The output of the capture logic 300 is fed to the set input of an SR-flip-flop 325 to create IhaveData 330. As a redundancy, the SR flip-flop 325 can be reset dominant, meaning that if its set and reset inputs are both asserted simultaneously, then it resets itself rather than going into a race condition. As a second redundancy, IhaveData 330 can be fed back into the capture logic 300 so that once a stage thinks that it has data, the stage stops asserting that data has been captured. This will prevent accidental reassertion of the ihaveData signal in the event that ReqFP is slow to withdraw.

Figure 3B:
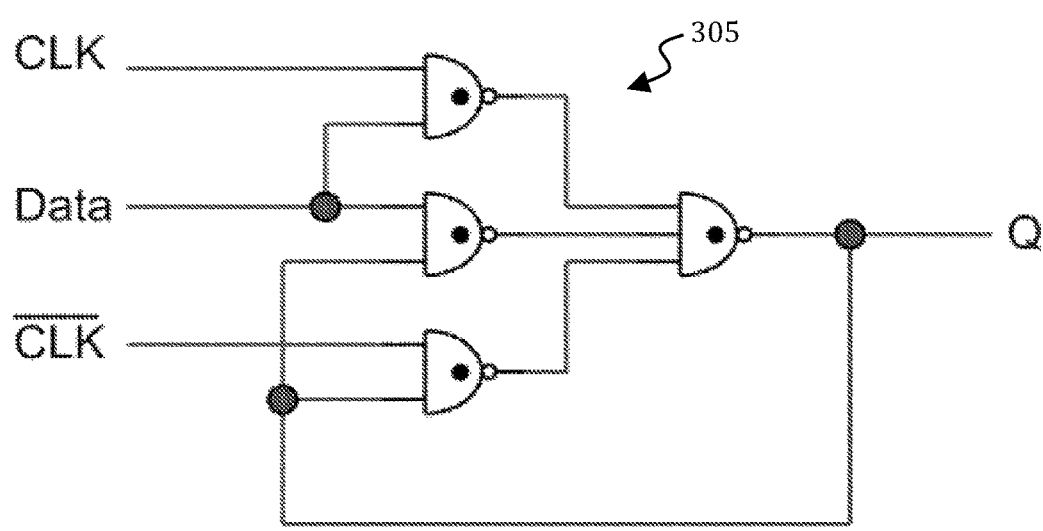
FIG. 3B illustrates an Earle latch used in the capture logic in accordance with an example embodiment.

Each stage of TDM system 100, such as, for example, stage 205, contains two blocks (not shown) utilizing capture logic 300, one block for each input. Earle latch 305 is a type of circuit that requires only a single data input, and its output takes as a constant, two gate delays. FIG. 3B illustrates Earle latch 305. Earle latch 305 is hazard free. Use of Earle latch 305 results in a consistent 2-gate propagation delay between all input signals and the output signal. Like the differential request signal, the use of Earle latch 305 serves to improve bit error rate in transmission. Another embodiment uses a level sensitive D-latch instead of Earle latch 305.

In the exemplary embodiment shown, TDM system 100 uses Earle latch 305 to capture the differential request signal. Both ReqFP_plus 310 and its captured version must be a logical 1. Both ReqFP_minus 311 and its captured version must be a logical 0. The captured signal activates as long as the input stage is not already holding data. This, in turn, sets Ihavedata 330 active through an SR latch 325. Ihavedata 330 comprises the actual data values transmitted and serves several purposes in TDM system 100. Delivery of Ihavedata 330 to the arbitration logic selects which input stage has access to the output. Inversion of Ihavedata 330 becomes the enable signal for the Earle latches 305 associated with this input stage (request and data). Finally, Ihavedata 330 is driven back as the acknowledge signal to the predecessor of this input stage.

Note that according to the classic 4-phase handshake, acknowledge must be withdrawn before a new request can be made. It is through this mechanism that TDM system 100 prevents lost data. As long as a particular input stage "has data", acknowledge is active. As long as acknowledge is active, no new requests can be initiated by the predecessor stage.

In various embodiments, the two gate levels of Earle latch 305 illustrated in FIG. 3B can, in some cases, be merged with the last two gate levels of the circuits driving the latch because many common computational circuits have an OR layer followed by an AND layer as their last two levels. Merging the latch function can implement the latch with no additional gate delay.

Figure 4:
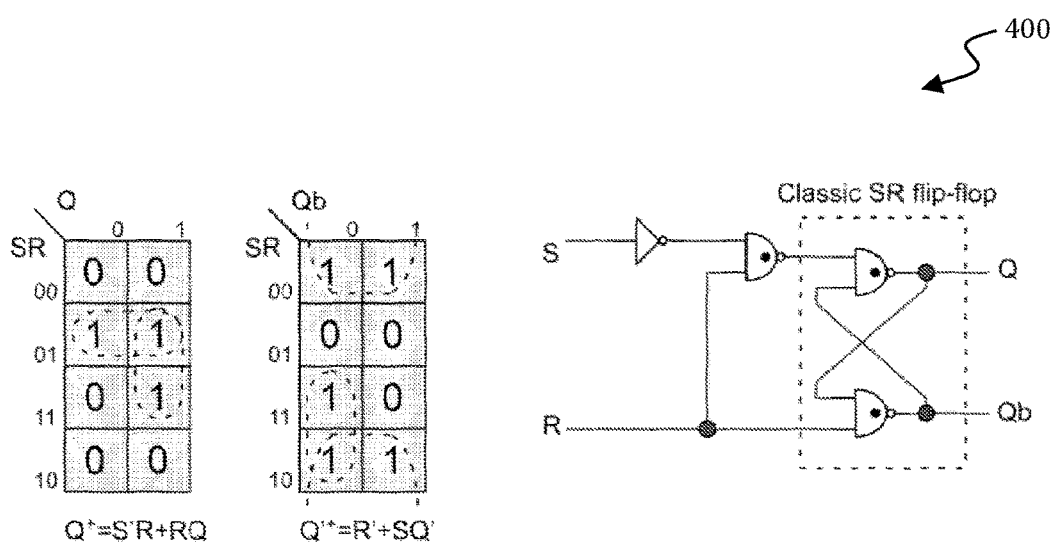
FIG. 4 illustrates a Reset-dominant SR latch in accordance with an example embodiment.

FIG. 4 illustrates an exemplary embodiment of an Ihavedata (or Reset-dominant) SR latch 400. Ihavedata SR latch 400 is a reset-dominant SR latch that improves the reliability of TDM system 100. Ihavedata SR latch 400 is a hazard-free latch that resets if R=0 independent of S, sets when S=0 and R=1, and holds when S=R=1. The arbitrator and the Acknowledge from the next stage of TDM system 100 control the reset signal. If the arbitrator has given a particular input stage access to the output, then the Acknowledge received from the next stage resets Ihavedata SR latch 400. The reset dominance helps ensure that if the predecessor stage is ready to assert a new request as soon as the resetting of Ihavedata has withdrawn its acknowledge, then the new request cannot result in a spurious acknowledge. No acknowledge is given to the predecessor stage until the Acknowledge from the next stage is withdrawn.

Figure 5:
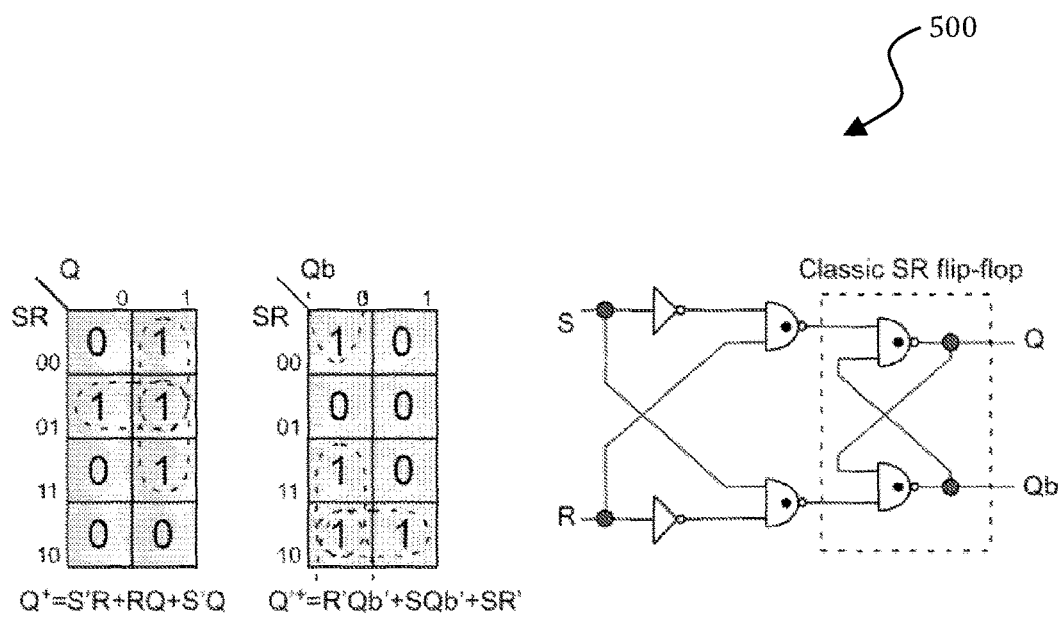
FIG. 5 illustrates a Hold-dominant latch in accordance with an example embodiment.

FIG. 5 illustrates an exemplary embodiment of an arbitration (or Hold-dominant) SR latch 500. The novel use of a hold-dominant SR latch accomplishes arbitration. Arbitration SR latch 500 is another hazard-free latch that only resets if S=1 and R=0 and only sets if S=0 and R=1. If S=R=1 or S=R=0, the state of the latch does not change. The fact that there are only two selection states simplifies arbitration logic, involving selection of either one input or the other input. Consequently, the integrity of TDM system 100 is not compromised when TDM system 100 switches between data from one input to data from the other input.

In the exemplary embodiment shown, the S input of arbitration SR latch 500 is the output of a three input OR gate. The acknowledge signal from the next stage, the request signal to the next stage, and one of the Ihavedata signals are ORed together. Analogously, the R input of arbitration SR latch 500 is a logical OR of the acknowledge signal from the next stage, the request signal to the next stage, and the other Ihavedata signal. The two Ihavedata signals and the two sets of stored data signals from both input stages are multiplexed. The request to the next stage is the Ihavedata signal from the selected input. The data to the next stage is the set of stored data signals from the selected input.

In the exemplary embodiment shown, whenever arbitration SR latch 500 selects one input stage, the arbitrator goes into its hold-dominant state (S=R=1) as soon as request is issued to the next stage. This causes the arbitrator to maintain the selected input stage. Eventually, the next stage replies with an Acknowledge that reinforces the hold-dominant state of arbitration SR latch 500. The acknowledge causes the Ihavedata signal of the selected input to be reset, which drops the request signal to the next stage. Eventually, the next stage withdraws its acknowledge in accordance with the 4-phase handshake, and at that point, the arbitrator is finally released from the hold dominant state (S=R=1) and is free to select the next input.

The exemplary embodiment of TDM system 100 is a clock-free data readout system. In TDM system 100, arbitration of transmission of data between two stages is more complicated due to arbitration between the two input streams. The use of latches to capture both request and data provides conformity between the request and data paths. In TDM system 100 use of latches, inputs are open and transparent until capture of request and data. The use of latches rather than edge-triggered flip-flops reduces the severity of the timing between request and data arrival and improves the bit error rate in transmission for this system. In the exemplary embodiment shown, TDM system 100 extends the simple request signal into a differential request signal pair to help account for differences in propagation delay between logical 1 s and logical 0 s.

In the exemplary embodiment of TDM system 100, a user may chain together TDM system blocks across several chips and/or boards without requiring a clock. No global control signals are necessary. Each link in the chain passes on data from its predecessor to its successor and adds its own data to the stream.

Figure 6:
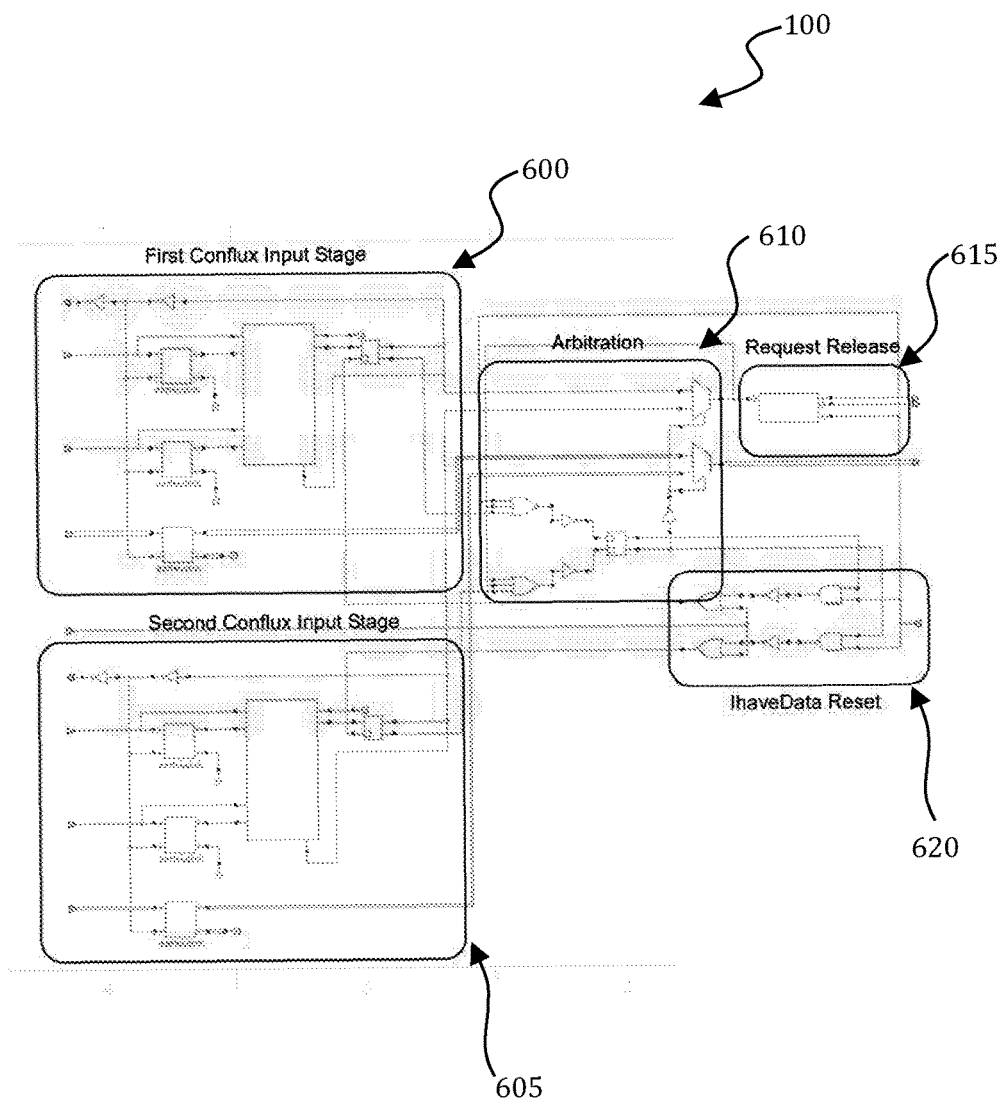
FIG. 6 illustrates a multiplexing conflux cell in accordance with the disclosed embodiments.

FIG. 6 illustrates an exemplary embodiment of TDM system 100 including modules associated with a multiplexing conflux cell. Using the 4-phase protocol, the present embodiments provide a multiplexing stage. Two input stages, input stage 600 and input stage 605 are organized side-by-side. Only one "output stage" is necessary, consisting of the Request Release module 615 (and associated circuitry) and the "IhaveData" reset module 620 (and associated circuitry).

Both "input stages" or input modules 600 and 605 can comprise at least two Earle gate request latches, Earle gate data latches, the capture logic, and the reset-dominant SR flip-flop that stores IhaveData. An arbitration module 610 is inserted between the input stages 600 and 605 and the request release module 615. The IhaveData Reset module 620 is augmented to allow it to reset either the first 600 or the second 605 input module.

The heart of the arbitration module 610 is a hold-dominant SR-flip-flop. If one master activates while the other already owns the bus, then the hold-dominate SR flip-flop prevents the state from changing until the owner is done. If both masters activate simultaneously, then the non-overlapping outputs ensure that there will be one winner only.

The inputs to the arbitration SR flip-flop are the two independent IhaveData signals gated by two other signals. The gating is an OR operation and the two other signals are AckFN and the input to the request release module 615. The purpose of this gating is to ensure that the arbitration circuit will only change at the right time. The input to the request release circuit is called "Internal Request" and it is active (logical 1) when one of the two input stages 600 or 605 has been chosen and has data. In other words, while the currently active stage has data, the arbitration module 610 is forced into one of its two hold states. AckFN is active as long as necessary to ensure that the successor stage has captured its data and can pass it on. While AckFN is active, the arbitration module 610 is likewise forced into one of its two hold states. In short, if it is safe for the arbitration module 610 to make a transition, then the Arbitration circuit will follow the two IhaveData signals. Otherwise it is held unchanged.

In one embodiment, a Fermi CMS pixel test chip (FCP130) with a 20-bit wide bus implements TDM system 100. The needs of the data packet dictate the bus width; other embodiments may have wider or narrower buses. The FCP130 includes forty stages of the TDM system, one for each super column. This embodiment provides an achievable data rate of up to 10 GBit/s internally. A full set of inputs and outputs for TDM system 100 are available to allow testing of several FCP130 chips daisy chained together.

Based on the foregoing, it can be appreciated that a number of embodiments, preferred and alternative, are disclosed herein. For example, in one embodiment, a two-to-one multiplexor comprises a first data input configured to hold data provided from a first preceding asynchronous pipeline stage and a second data input configured to hold data provided from a second preceding asynchronous pipeline stage, a 4-phase bundled data protocol facilitating communication between the first and the second data inputs and the first and second preceding asynchronous pipeline stage, an arbitration unit connected to the first data input and the second data input, and configured to select which of the data from the first and the second data inputs is released, a request release unit, and a reset unit wherein the arbitration unit, the request release unit, and the reset unit implement and complete a second 4-phase bundled data protocol facilitating communication with a succeeding asynchronous pipeline stage for transmission of the data chosen by the arbitration unit thereby providing asynchronous multiplexing of the data.

In an embodiment, the arbitration unit selects which of the data from the data inputs is released by selecting one of the first and second data inputs as an arbitration winner. In an embodiment, the arbitration unit comprises a hold-dominant set-reset latch.

In another embodiment, the two-to-one multiplexor further comprises a capture logic incorporated in each of the first and second data inputs configured to require both a true and an inverted version of a request arrive at the first and second data inputs with a correct logical value thereby providing a fully differential request line for the 4-phase bundled data protocol.

In an embodiment of the two-to-one multiplexor, each of the first and second data inputs comprise latches configured to provide a data and request capturing latches. The latches can comprise Earle latches.

In another embodiment, the two-to-one multiplexor further comprises a stored value captured in the first and second data inputs wherein the stored value alerts the arbitration unit to a data presence in at least one of the first and second data inputs, the stored value closes the data and request capturing latches, and the stored value comprises an Acknowledge signal of the asynchronous 4-phase protocol.

In an embodiment, the two-to-one multiplexor further comprises a first data input stage comprising a reset-dominant set-reset latch configured to store a captured request; and a second data input stage comprising a reset-dominant set-reset latch configured to store a captured request. In another embodiment, the request release unit gates a request signal with an Acknowledge signal.

In yet another embodiment, a method for two-to-one multiplexing comprises holding data provided from a first preceding asynchronous pipeline stage in a first data input and holding data provided from a second preceding asynchronous pipeline stage in a second data input, facilitating communication between the first and the second data inputs and the first and second preceding asynchronous pipeline stage with a 4-phase bundled data protocol, selecting which of the data from the first and the second data input is released with an arbitration unit connected to the first data input and the second data input, transmitting of the data chosen by the arbitration unit wherein the arbitration unit, a request release unit, and a reset unit implement and complete a second 4-phase bundled data protocol facilitating communication with a succeeding asynchronous pipeline stage thereby providing asynchronous multiplexing of the data.

In an embodiment, selecting which of the data from the first and the second data input is released with an arbitration unit connected to the first data input and the second data input further comprises selecting one of the first and second data inputs as an arbitration winner.

In an embodiment of the method, the arbitration unit comprises a hold-dominant set-reset latch.

In another embodiment, the method further comprises requiring both a true and an inverted version of a request arrive at the first and second data inputs with a correct logical value thereby providing a fully differential request line for the 4-phase bundled data protocol with a capture logic incorporated in each of the first and second data inputs.

In another embodiment, the method comprises providing data and request capturing latches via the first and the second data inputs. The latches can comprise Earle latches.

In another embodiment, the method further comprising capturing a stored value in the first and second data inputs wherein the stored value alerts the arbitration unit to a data presence in at least one of the first and second data inputs, the stored value closes the data and request capturing latches, and the stored value comprises an Acknowledge signal of the asynchronous 4-phase protocol.

In an embodiment, the method further comprises storing a captured request in a first data input stage comprising a reset-dominant set-reset latch and storing a captured request in a second data input stage comprising a reset-dominant set-reset latch. The method further comprises gating a request signal with an Acknowledge signal with a request release unit.

In yet another embodiment, a system comprising a two-to-one multiplexor comprising: a first data input configured to hold data provided from a first preceding asynchronous pipeline stage and a second data input configured to hold data provided from a second preceding asynchronous pipeline stage, a 4-phase bundled data protocol facilitating communication between the first and the second data inputs and the first and second preceding asynchronous pipeline stage, an arbitration unit connected to the first data input and the second data input, and configured to select which of the data from the first and the second data inputs is released, a request release unit, and a reset unit wherein the arbitration unit, the request release unit, and the reset unit implement and complete a second 4-phase bundled data protocol facilitating communication with a succeeding asynchronous pipeline stage for transmission of the data chosen by the arbitration unit thereby providing asynchronous multiplexing of the data.

In an embodiment, the system further comprises a plurality of the two-to-one multiplexors distributed along the asynchronous pipeline.

It will be appreciated that variations of the above-disclosed and other features and functions, or alternatives thereof, may be desirably combined into many other different systems or applications. Also, that various presently unforeseen or unanticipated alternatives, modifications, variations or improvements therein may be subsequently made by those skilled in the art which are also intended to be encompassed by the following claims.

What is claimed is:

1. A two-to-one multiplexor comprising:
a first data input configured to hold data provided from a first preceding asynchronous pipeline stage and a second data input configured to hold data provided from a second preceding asynchronous pipeline stage wherein a 4-phase bundled data protocol facilitates communication between said first and said second data inputs and said first and second preceding asynchronous pipeline stage;
an arbitration unit connected to said first data input and said second data input, and configured to select which of said data from said first and said second data inputs is released wherein said arbitration unit comprises a hold-dominant set-reset latch;
a request release unit; and
a reset unit wherein said arbitration unit, said request release unit, and said reset unit implement and complete a second 4-phase bundled data protocol facilitating communication with a succeeding asynchronous pipeline stage for transmission of said data selected by said arbitration unit thereby providing asynchronous multiplexing of said data.

2. The two-to-one multiplexor of claim 1 wherein said arbitration unit selects which of said data from said data inputs is released by selecting one of said first and second data inputs as an arbitration winner.

3. The two-to-one multiplexor of claim 1 further comprising:
a capture logic incorporated in each of said first and second data inputs configured to require both a true and an inverted version of a request arrive at said first and second data inputs with a correct logical value thereby providing a fully differential request line for said 4-phase bundled data protocol.

4. The two-to-one multiplexor of claim 3 wherein each of said first and second data inputs comprise latches configured to provide a data and request capturing latches.

5. The two-to-one multiplexor of claim 4 wherein said latches comprise Earle latches.

6. The two-to-one multiplexor of claim 4 further comprising:
a stored value captured in said first and second data inputs wherein said stored value alerts said arbitration unit to a data presence in at least one of said first and second data inputs, said stored value closes said data and request capturing latches, and presence of said stored value is signaled by said request.

7. The two-to-one multiplexor of claim 1 further comprising
a first data input stage comprising a reset-dominant set-reset latch configured to store a captured request; and
a second data input stage comprising a reset-dominant set-reset latch configured to store a captured request.

8. The two-to-one multiplexor of claim 1 wherein said request release unit gates a request signal with an Acknowledge signal.

9. A method for two-to-one multiplexing comprising:
holding data provided from a first preceding asynchronous pipeline stage in a first data input and holding data provided from a second preceding asynchronous pipeline stage in a second data input;
facilitating communication between said first and said second data inputs and said first and second preceding asynchronous pipeline stage with a 4-phase bundled data protocol;
selecting which of said data from said first and said second data input is released with an arbitration unit connected to said first data input and said second data input wherein said arbitration unit comprises a hold-dominant set-reset latch; and
transmitting of said data selected by said arbitration unit wherein said arbitration unit, a request release unit, and a reset unit implement and complete a second 4-phase bundled data protocol facilitating communication with a succeeding asynchronous pipeline stage thereby providing asynchronous multiplexing of said data.

10. The method of claim 9 wherein selecting which of said data from said first and said second data input is released with the arbitration unit connected to said first data input and said second data input further comprises: selecting one of said first and second data inputs as an arbitration winner.

11. The method of 9 further comprising:
requiring both a true and an inverted version of a request arrive at said, first and second data inputs with a correct logical value thereby providing a fully differential request line for said 4-phase bundled data protocol with a capture logic incorporated in each of said first and second data inputs.

12. The method of claim 11 further comprising:
providing data and request capturing latches via said first and said second data inputs.

13. The method of claim 12 wherein said latches comprise Earle latches.

14. The method of claim 12 further comprising:
capturing a stored value in said first and second data inputs wherein said stored value alerts said arbitration unit to a data presence in at least one of said first and second data inputs, said stored value closes said data and request capturing latches, and presence of said stored value is signaled by said request.

15. The method of claim 9 further comprising
storing a captured request in a first data input stage comprising a reset-dominant set-reset latch; and
storing a captured request in a second data input stage comprising a reset-dominant set-reset latch.

16. The method of claim 9 further comprising:
gating a request signal with an Acknowledge signal with a request release unit.

17. A system comprising:
a two-to-one multiplexor comprising:
a first data input configured to hold data provided from a first preceding asynchronous pipeline stage and a second data input configured to hold data provided from a second preceding asynchronous pipeline stage wherein a 4-phase bundled data protocol facilitates communication between said first and said second data inputs and said first and second preceding asynchronous pipeline stage;
an arbitration unit connected to said first data input and said second data input, and configured to select which of said data from said first and said second data inputs is released wherein said arbitration unit comprises a hold-dominant set-reset latch;
a request release unit; and
a reset unit wherein said arbitration unit, said request release unit, and said reset unit implement and complete a second 4-phase bundled data protocol facilitating communication with a succeeding asynchronous pipeline stage for transmission of said data selected by said arbitration unit thereby providing asynchronous multiplexing of said data.

18. The system of claim 17 further comprising:
a plurality of said two-to-one multiplexors distributed along said asynchronous pipeline.

* * * * *